US012020618B2

(12) United States Patent
Choi et al.

(10) Patent No.: US 12,020,618 B2
(45) Date of Patent: Jun. 25, 2024

(54) SETTING METHOD OF CHARGE SHARING TIME AND NON-TRANSITORY COMPUTER-READABLE MEDIUM

(71) Applicant: SAMSUNG ELECTRONICS CO., LTD., Suwon-si (KR)

(72) Inventors: Chulho Choi, Suwon-si (KR); Yu-Chieh Huang, Zhubei (TW); Hajoon Shin, Suwon-si (KR); Han-Chiang Su, Zhubei (TW); Jia-Way Chen, Zhubei (TW); Kyunlyeol Lee, Zhubei (TW); Yi-Chien Wen, Zhubei (TW); Yongjoo Song, Suwon-si (KR); Shih-Chiao Huang, Zhubei (TW)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/990,179

(22) Filed: Nov. 18, 2022

(65) Prior Publication Data

US 2023/0162638 A1 May 25, 2023

(30) Foreign Application Priority Data

Nov. 23, 2021 (KR) ........................ 10-2021-0162791

(51) Int. Cl.
*G09G 3/20* (2006.01)

(52) U.S. Cl.
CPC ....... *G09G 3/20* (2013.01); *G09G 2310/0251* (2013.01); *G09G 2310/0275* (2013.01); *G09G 2320/0223* (2013.01)

(58) Field of Classification Search
None
See application file for complete search history.

(56) References Cited

U.S. PATENT DOCUMENTS

| | | | |
|---|---|---|---|
| 8,223,103 B2 | 7/2012 | Kim et al. | |
| 9,240,154 B2 | 1/2016 | Park et al. | |
| 9,330,586 B2 | 5/2016 | Pyun et al. | |
| 9,530,373 B2 | 12/2016 | Ban et al. | |
| 9,852,707 B2 | 12/2017 | Shin et al. | |

(Continued)

FOREIGN PATENT DOCUMENTS

CN 113643645 A * 11/2021

*Primary Examiner* — Amr A Awad
*Assistant Examiner* — Donna V Bocar
(74) *Attorney, Agent, or Firm* — Sughrue Mion, PLLC

(57) ABSTRACT

The present disclosure provides methods, apparatuses, and non-transitory computer-readable mediums for setting charge sharing times, which may be adaptable to a display panel. In some embodiments, the apparatus includes a pixel array and a source driver configured to drive each column of the pixel array. In some embodiments, a setting method of charge sharing times includes grouping a plurality of pixels of a pixel array in a row direction to form a plurality of pixel groups. The setting method further includes setting a charge sharing time of each pixel group of the plurality of pixel groups according to a quantity of pixel groups in the plurality of pixel groups. A charge sharing time of a pixel group located closest to a source driver in the pixel array is greater than a charge sharing time of a pixel group located farthest from the source driver in the pixel array.

20 Claims, 3 Drawing Sheets

(56) References Cited

U.S. PATENT DOCUMENTS

| | | | | |
|---|---|---|---|---|
| 10,147,371 | B2 | 12/2018 | Sang et al. | |
| 10,403,224 | B2 * | 9/2019 | Hsu | G09G 3/3674 |
| 2004/0239604 | A1 * | 12/2004 | Watsuda | G09G 3/3677 345/95 |
| 2016/0133216 | A1 * | 5/2016 | Song | G09G 3/3677 345/87 |
| 2018/0011598 | A1 * | 1/2018 | Ku | G06F 3/04166 |
| 2021/0157608 | A1 * | 5/2021 | Yu | G06F 9/4411 |

* cited by examiner

SETTING METHOD OF CHARGE SHARING TIME AND NON-TRANSITORY COMPUTER-READABLE MEDIUM

CROSS-REFERENCE TO RELATED APPLICATIONS

This application claims benefit of priority under 35 U.S.C. § 119 to Korean Provisional Patent Application No. 10-2021-0162791, filed on Nov. 23, 2021, in the Korean Intellectual Property Office, the disclosure of which is incorporated by reference herein in its entirety.

BACKGROUND

1. Field

The present disclosure relates to charge sharing, and more particularly, to a setting method of charge sharing time and a non-transitory computer-readable medium.

2. Description of Related Art

As display panels continue to be manufactured in ever increasing sizes, implementing a high frame rate on the display panels may likely increase power consumption of the display panels when driving integrated circuits (ICs), and, as a result, a cost for heat dissipation of the display panels may also increase.

However, various countries have imposed lower power consumption requirements on liquid-crystal display televisions (LCD TVs), for example. For that reason, low power consumption design is imperative across the world. In related devices, reduction of power consumption may be achieved by reducing the range of charge and discharge voltages. Therefore, at present, a related source driver may be adopted to add a charge sharing mechanism to potentially reduce power consumption. However, in related devices, the charge sharing times of various pixels in the display panel may be the same, which may result in that there is no sufficient time for the voltage of some pixels to fully reach the voltage level of the charge balance. As a result, optimal power consumption may not be achieved. Thus, there is a need for setting the charge sharing time in a manner that reduces power consumption.

It should be noted that the “Background” section is used to facilitate understanding of the technology of the present disclosure. Some (or all) of the content disclosed in the “Background” section may not be known in the related art by those of ordinary skill in the art. The content disclosed in the “Background” section may not be necessarily known to those with ordinary knowledge in the technical field before the application of the present technology.

SUMMARY

The present disclosure provides a setting method of charge sharing time and a non-transitory computer-readable medium, which may flexibly adjust the charge sharing time of each pixel according to device requirements and panel load, in a manner that power consumption of the display panel may be reduced.

According to an aspect of the present disclosure, a setting method of charge sharing times of a display panel, includes grouping a plurality of pixels of a pixel array in a row direction to form a plurality of pixel groups. The setting method further includes setting a charge sharing time of each pixel group of the plurality of pixel groups according to a quantity of pixel groups in the plurality of pixel groups. A first charge sharing time of a first pixel group located closest to a source driver in the pixel array is greater than a second charge sharing time of a second pixel group located farthest from the source driver in the pixel array.

In some embodiments, the setting of the charge sharing time may include setting sequentially decreasing charge sharing times to the plurality of pixel groups, respectively, according to a location of a corresponding pixel group of the plurality of pixel groups with respect to a location of the source driver. The first charge sharing time of the first pixel group located closest to the source driver may be greater than each of first remaining sequentially decreasing charge sharing times of first remaining pixel groups of the plurality of pixel groups. The second charge sharing time of the second pixel group located farthest from the source driver may be less than each of second remaining sequentially decreasing charge sharing times of second remaining pixel groups of the plurality of pixel groups.

In some embodiments, the setting method may further include obtaining a predetermined charge sharing time of the plurality of pixels, calculating an additional charge sharing time of each pixel group of the plurality of pixel groups according to the quantity of pixel groups and charge sharing time differences between each pixel group of the plurality of pixel groups, and adding the predetermined charge sharing time and the additional charge sharing time of each pixel group of the plurality of pixel groups to obtain the charge sharing time of each pixel group of the plurality of pixel groups.

In some embodiments, the second charge sharing time of the second pixel group located farthest from the source driver in the pixel array may be equal to the predetermined charge sharing time.

In some embodiments, the setting method may further include dividing, using a frequency divider, the charge sharing time differences between each pixel group of the plurality of pixel groups to increase the charge sharing time of each pixel group of the plurality of pixel groups.

In some embodiments, the setting of the charge sharing time further may include setting the charge sharing time of each pixel group of the plurality of pixel groups according to a resistive-capacitive (RC) load of pixels in each pixel group of the plurality of pixel groups.

According to an aspect of the present disclosure, a non-transitory computer-readable medium stores computer program instructions. The computer program instructions are configured, when executed by a processor of a display panel, to cause the display panel to group a plurality of pixels of a pixel array in a row direction to form a plurality of pixel groups. The computer program instructions are further configured to further cause the display panel to set a charge sharing time of each pixel group of the plurality of pixel groups according to a quantity of pixel groups in the plurality of pixel groups. A first charge sharing time of a first pixel group located closest to a source driver in the pixel array is greater than a second charge sharing time of a second pixel group located farthest from the source driver in the pixel array.

In some embodiments, the computer program instructions may be further configured to further cause the display panel to set sequentially decreasing charge sharing times to the plurality of pixel groups, respectively, according to a location of a corresponding pixel group of the plurality of pixel groups with respect to a location of the source driver. The first charge sharing time of the first pixel group located closest to the source driver is greater than each of first remaining sequentially decreasing charge sharing times of first remaining pixel groups of the plurality of pixel groups. The second charge sharing time of the second pixel group located farthest from the source driver is less than each of second remaining sequentially decreasing charge sharing times of second remaining pixel groups of the plurality of pixel groups.

In some embodiments, the computer program instructions may be further configured to further cause the display panel to obtain a predetermined charge sharing time of the plurality of pixels, calculate an additional charge sharing time of each pixel group of the plurality of pixel groups according to the quantity of pixel groups and charge sharing time differences between each pixel group of the plurality of pixel groups, and add up the predetermined charge sharing time and the additional charge sharing time of each pixel group of the plurality of pixel groups to obtain the charge sharing time of each pixel group of the plurality of pixel groups.

In some embodiments, the second charge sharing time of the second pixel group located farthest from the source driver in the pixel array may be equal to the predetermined charge sharing time.

In some embodiments, the computer program instructions may be further configured to further cause the display panel to divide, using a frequency divider, the charge sharing time differences between each pixel group of the plurality of pixel groups to increase the charge sharing time of each pixel group of the plurality of pixel groups.

In some embodiments, the computer program instructions may be further configured to further cause the display panel to set the charge sharing time of each pixel group of the plurality of pixel groups according to an RC load of pixels in each pixel group of the plurality of pixel groups.

According to an aspect of the present disclosure, an apparatus includes a pixel array, a source driver, a memory storing one or more instructions, and a processor. The pixel array includes a plurality of pixels disposed in a plurality of columns. The source driver is configured to drive each column of the plurality of columns of the pixel array. The processor is communicatively coupled to the pixel array, the source driver, and the memory, and is configured to execute the one or more instructions stored in the memory to group the plurality of pixels of the pixel array in a row direction to form a plurality of pixel groups. The processor is further configured to execute the one or more instructions to set a charge sharing time of each pixel group of the plurality of pixel groups according to a quantity of pixel groups in the plurality of pixel groups. A first charge sharing time of a first pixel group located closest to the source driver is greater than a second charge sharing time of a second pixel group located farthest from the source driver.

In some embodiments, the processor may be further configured to execute the one or more instructions to set sequentially decreasing charge sharing times to the plurality of pixel groups, respectively, according to a location of a corresponding pixel group of the plurality of pixel groups with respect to a location of the source driver. The first charge sharing time of the first pixel group located closest to the source driver may be greater than each of first remaining sequentially decreasing charge sharing times of first remaining pixel groups of the plurality of pixel groups. The second charge sharing time of the second pixel group located farthest from the source driver may be less than each of second remaining sequentially decreasing charge sharing times of second remaining pixel groups of the plurality of pixel groups.

In some embodiments, the processor may be further configured to execute the one or more instructions to obtain a predetermined charge sharing time of the plurality of pixels, calculate an additional charge sharing time of each pixel group of the plurality of pixel groups according to the quantity of pixel groups and charge sharing time differences between each pixel group of the plurality of pixel groups, and add up the predetermined charge sharing time and the additional charge sharing time of each pixel group of the plurality of pixel groups to obtain the charge sharing time of each pixel group of the plurality of pixel groups.

In some embodiments, the second charge sharing time of the second pixel group located farthest from the source driver may be equal to the predetermined charge sharing time.

In some embodiments, the processor may be further configured to execute the one or more instructions to divide, using a frequency divider, the charge sharing time differences between each pixel group of the plurality of pixel groups to increase the charge sharing time of each pixel group of the plurality of pixel groups.

In some embodiments, the processor may be further configured to execute the one or more instructions to set the charge sharing time of each pixel group of the plurality of pixel groups according to an RC load of pixels in each pixel group of the plurality of pixel groups.

Based on the above, the setting method of charge sharing time, the apparatus, and the non-transitory computer-readable medium provided by the embodiments of the present disclosure may group a plurality of pixels, and then set the charge sharing time of each pixel according to the total number of pixel groups. There is a decrement from the charge sharing time of the pixel closest to the source driver in the pixel array to the charge sharing time of the pixel farthest from the source driver in the pixel array. In this way, the setting method of charge sharing time of the present disclosure may further reduce power consumption when compared with related setting methods of charge sharing time. In addition, the setting method of charge sharing time of the present disclosure may also adapt to different panel loads and help the system to save power (power saving) through the flexible and programmable setting of charge sharing time.

In order to make the present disclosure more comprehensible, the following specific examples are given, and are described in detail as follows in conjunction with the accompanying drawings.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION OF EMBODIMENTS

Figure 1:
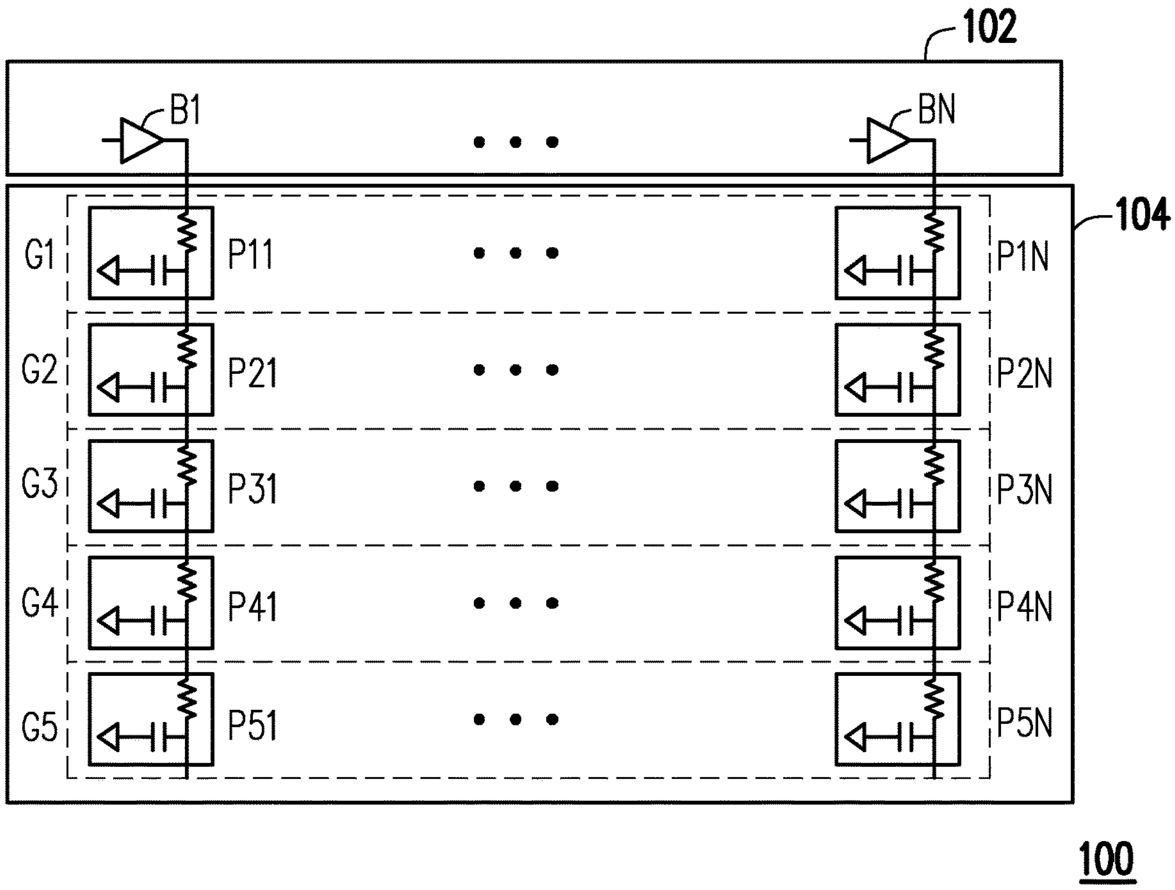
FIG. 1 is a block diagram of a display panel, according to an embodiment.

In the following detailed description, only certain embodiments of the present invention have been shown and described, simply by way of illustration. As those skilled in the art would realize, the described embodiments may be modified in various different ways, all without departing from the spirit or scope of the present invention.

Accordingly, the drawings and description are to be regarded as illustrative in nature and not restrictive, and like reference numerals designate like elements throughout the specification disclosure. In the flowcharts described with reference to the drawings in this specification disclosure, the operation order may be changed, various operations may be merged, certain operations may be divided, and certain operations may not be performed.

An expression recited in the singular may be construed as singular or plural unless the expression "one", "single", etc., is used. Terms including ordinal numbers such as first, second, and the like, will be used only to describe various components, and are not to be interpreted as limiting these components. The terms may be only used to differentiate one component from others.

It will be understood that, although the terms first, second, third, fourth, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the disclosure.

As is traditional in the field, the embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. In embodiments, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the present scope. Further, the blocks, units and/or modules of the embodiments may be physically combined into more complex blocks, units and/or modules without departing from the present scope.

The term "coupled" (or connected) as used throughout the specification of this disclosure (including claims of the present disclosure) may refer to any direct or indirect means of connection. For example, if it is described in the text that a first device is coupled (or connected) to a second device, it should be interpreted that the first device can be directly connected to the second device, or the first device can be indirectly connected to the second device through another device or some other connection means. Terms such as "first" and "second" mentioned in the full text of the description (including claims of the present disclosure) are used to name the elements or to distinguish different embodiments or scopes, rather than to limit the upper or lower limit of the number of elements, nor is it intended to limit the order of the elements. Also, where possible, elements/components/steps denoted by the same reference numerals in the drawings and embodiments represent the same or similar parts. Elements/components/steps that are denoted by the same reference numerals or the same terminology in different embodiments may serve as cross reference for each other.

An advantage of the present disclosure is that the setting of charge sharing time may be programmed. That is, the present disclosure may reduce power consumption by setting the charge sharing time of each pixel in the display panel. The setting method of charge sharing time of the present disclosure may be suitable for various panel applications, but may also obtain an optimal panel quality according to the power saved by the panel load.

FIG. 1 is a block diagram of a display panel according to an embodiment of the present disclosure. Referring to FIG. 1, the display panel 100 may include a source driver 102 and a pixel array 104. The display panel 100 may be, for example, a liquid-crystal display (LCD), a thin film transistor LCD (TFT-LCD) display, a light-emitting diode (LED) display, an organic light-emitting diode (OLED) display, or a device with a display function such as a plasma display, but is not limited thereto.

In an embodiment, the source driver 102 may be coupled to the pixel array 104. The pixel array 104 may be an array that includes a plurality of pixels P11-P1N, P21-P2N, P31-P3N, P41-P4N, and P51-P5N (hereinafter, "P" generally), where N is an integer greater than 1. The plurality of pixels P may be arranged in multiple columns and/or multiple rows. The source driver 102 may drive each column of the pixel array 104. In an embodiment, the source driver 102 may include a plurality of output buffers B 1-BN (hereinafter, "B" generally), and the plurality of output buffers B may respectively drive a column of the pixel array 104 and apply a display signal to each pixel of the column respectively to achieve the display effect.

For the sake of clarity, FIG. 1 only shows a plurality of pixels P11-P1N, P21-P2N, P31-P3N, P41-P4N, and P51-P5N as examples, but those with ordinary knowledge in the art may adjust the number (e.g., quantity) of pixels and/or the arrangement of the pixels (e.g., columns, rows) as appropriate according to device requirements. That is, the present disclosure is not limited in this regard.

In an embodiment, the display panel 100 may include a controller (not shown). The controller may comprise, for example, a central processing unit (CPU), one or more programmable general-purpose or special-purpose microprocessors, digital signal processors (DSPs), programmable controllers, application specific integrated circuits (ASICs) or other similar devices or combinations of these devices, but is not limited thereto. In an embodiment, the controller may be coupled to the source driver 102. Alternatively or additionally, the controller may load firmware code (e.g., computer instructions and/or programs) from a storage device (not shown) to execute the setting method of charge sharing time according to embodiments of the present disclosure. The setting method of charge sharing time is described in reference to FIG. 2.

Figure 2:
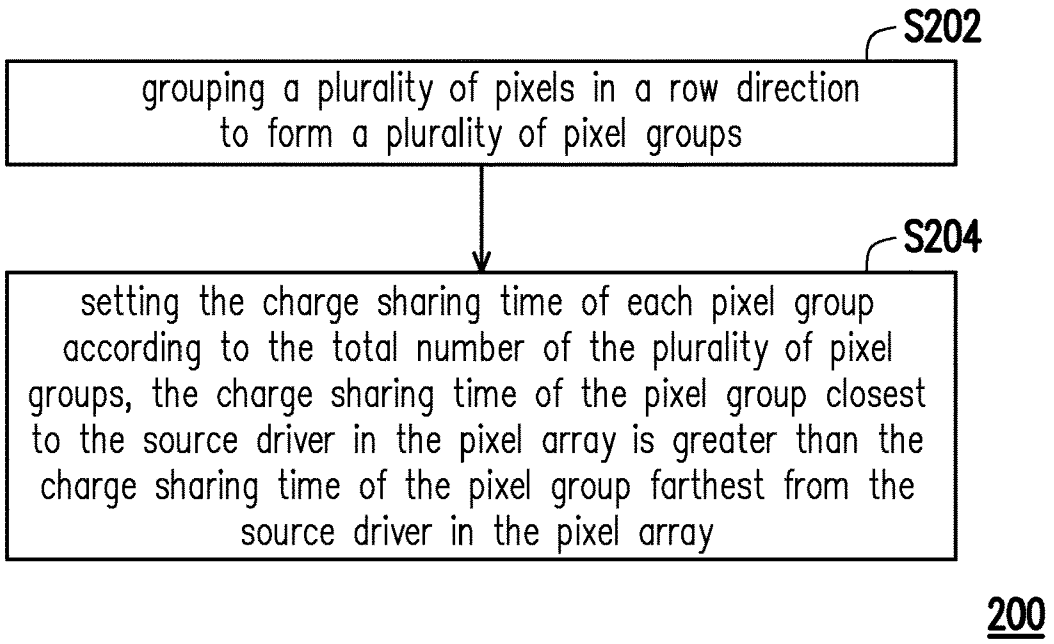
FIG. 2 is a flowchart of a setting method of charge sharing time, according to an embodiment.

FIG. 2 is a flowchart of an exemplary setting method of charge sharing time according to an embodiment of the present disclosure. Referring to FIGS. 1 and 2, the setting method 200 may be applicable to the display panel 100 of FIG. 1. The following description describes detailed steps of the setting method 200 of charge sharing time of the present disclosure in combination with the operation relationship between the devices in the display panel 100.

In step S202, the controller groups a plurality of pixels in a row direction to form a plurality of pixel groups. That is, the controller may group the plurality of pixels according to device requirements. For example (not limited thereto), in an embodiment, the controller may divide the plurality of pixels P in the pixel array 104 into 5 groups (e.g., the total number of groups G is equal to 5) in the row direction to form pixel groups G1, G2, G3, G4, and G5. The pixel group G1 may include the pixels P11-P1N, the pixel group G2 may include the pixels P21-P2N, the pixel group G3 may include the pixels P31-P3N, the pixel group G4 may include the pixels P41-P4N, and the pixel group G5 may include the pixels P51-P5N. It should be noted that, for the sake of clarity, only five pixel groups G1, G2, G3, G4, and G5 are shown in FIG. 1. However, those skilled in the art may adjust the number of pixel groups (e.g., the total number of groups G) as appropriate according to device requirements. That is, the present disclosure is not limited in this regard.

In step S204, the controller may set the charge sharing time of each pixel group according to the total number (e.g., quantity) of the plurality of pixel groups (e.g., G). In an embodiment, the controller may set the charge sharing time of the pixel group closest to the source driver 102 in the pixel array 104 to be greater than the charge sharing time of the pixel group farthest from the source driver 102 in the pixel array 104. Alternatively or additionally, in an embodiment, there may be a decrement from the charge sharing time of the pixel group closest to the source driver 102 in the pixel array 104 to the charge sharing time of the pixel group farthest from the source driver 102 in the pixel array 104. That is, the controller may set sequentially decreasing charge sharing times to each of the plurality of pixel groups (e.g., G1, G2, G3, G4, and G5) according to a location of a corresponding pixel group of the plurality of pixel groups with respect to a location of the source driver 102. For example (not limited thereto), in an embodiment, the pixel group closest to the source driver 102 is the pixel group G1, and the pixel group farthest from the source driver 102 is the pixel group G5. Therefore, the controller sets the charge sharing time of the pixel group G1 to be greater than the charge sharing time of the pixel group G5, and there is a decrement from the charge sharing time of the pixel group G1 to the charge sharing time of the pixel group G5. That is, the charge sharing time of the pixel group G2 is less than the charge sharing time of the pixel group G1, the charge sharing time of the pixel group G3 is less than the charge sharing time of the pixel group G2, the charge sharing time of the pixel group G4 is less than the charge sharing time of the pixel group G3, and the charge sharing time of the pixel group G5 is less than the charge sharing time of the pixel group G4.

The calculation and setting method of the charge sharing time is described in further detail below. In an embodiment, the controller obtains a predetermined charge sharing time OCSt of the plurality of pixels P according to device requirements and/or panel specifications. That is, each pixel P in the display panel 100 may be initialized with the same predetermined charge sharing time OCSt. For example (not limited thereto), the controller may obtain the predetermined charge sharing time OCSt as shown in Equation 1.

$$\mathrm{OCSt}=(2^5 TH<5>+2^4 TH<4>+2^3 TH<3>+2^2 TH<2>+2^1 TH<1>+2^0 TH<0>)\times 8\times 10\times T_{UI} \quad \text{[Eq. 1]}$$

Referring to Equation 1, TH<0>-TH<5> and $T_{UI}$ may represent parameters recorded in the product data sheet of the display device 100. For example, TH<0>-TH<5> may represent a 6-bit equivalent square wave width calculated by a digital logic circuit, and $T_{UI}$ may represent the unit interval.

Alternatively or additionally, the controller may calculate the additional charge sharing time ACSt of each pixel group according to the total number of groups G and the charge sharing time difference Tcsd between the groups. That is, the controller may adjust the total number of groups G and the charge sharing time difference Tcsd to an optimal combined value to calculate the additional charge sharing time ACSt for each pixel group. For example (not limited thereto), in an embodiment, the calculation method of the additional charge sharing time ACSt of the pixel group G1 may be performed according to Equation 2. Alternatively or additionally, the additional charge sharing time ACSt of the pixel groups G2, G3, G4, and G5 may be sequentially decremented by the charge sharing time difference Tcsd. For example, the additional charge sharing time ACSt of the pixel group G1 may be set to 4×Tcsd, the additional charge sharing time ACSt of the pixel group G2 may be set to 3×Tcsd, the additional charge sharing time ACSt of the pixel group G3 may be set to 2×Tcsd, the additional charge sharing time ACSt of the pixel group G4 may be set to 1×Tcsd, and the additional charge sharing time ACSt of the pixel group G5 may be set to 0×Tcsd.

$$\mathrm{ACSt}=(G-1)\times \mathrm{Tcsd} \quad \text{[Eq. 2]}$$

In some embodiments, the controller may combine (e.g., add up) the predetermined charge sharing time OCSt and the additional charge sharing time ACSt of each pixel group to obtain the charge sharing time CSt of each pixel group, as shown in Equation 3.

$$CSt=\mathrm{OCSt}+\mathrm{ACSt} \quad \text{[Eq. 3]}$$

In light of the above, the controller may set the charge sharing time of the pixel group closest to the source driver 102 in the pixel array 104 to be smoothly decremented to the charge sharing time of the pixel group farthest from the source driver 102 in the pixel array 104. For example (not limited thereto), in an embodiment, the charge sharing time CSt of the pixel group G1 may be set to OCSt+4× Tcsd, the charge sharing time CSt of the pixel group G2 may be set to OCSt+3×Tcsd, the charge sharing time CSt of the pixel group G3 may be set to OCSt+2×Tcsd, the charge sharing time CSt of the pixel group G4 may be set to OCSt+1×Tcsd, and the charge sharing time CSt of the pixel group G5 may be set to OCSt+0×Tcsd. As such, the charge sharing time CSt of the pixel group G5 that is farthest from the source driver 102 in the pixel array 104 may be equal to the predetermined charge sharing time OCSt.

Table 1 indicates power saving evaluation results of different charge sharing times based on the above-mentioned setting method of charge sharing time. As shown in Table 1, at least about 2 to 5% of power may be saved depending on the different proximal charge sharing times.

TABLE 1

| 1 row of time = 7.4 μ sec (Tcsd = 0.4 μ sec) | | | | | |
|---|---|---|---|---|---|
| | | Power (Watts) | | | |
| CSt (μ sec) | | | | Remote + | Power |
| Remote | Proximal | Remote | Proximal | Proximal | saving (%) |
| 1.6 | 1.6 (+0Tcsd) | 0.329 | 0.329 | 0.329 | 0.0 |
| 1.6 | 2.0 (+1Tcsd) | 0.329 | 0.319 | 0.324 | 1.7 |
| 1.6 | 2.4 (+2Tcsd) | 0.329 | 0.310 | 0.320 | 3.0 |
| 1.6 | 2.8 (+3Tcsd) | 0.329 | 0.303 | 0.313 | 4.0 |
| 1.6 | 3.2 (+4Tcsd) | 0.329 | 0.297 | 0.311 | 4.9 |

The setting method of charge sharing time of the present disclosure is based on the device settings related to application of the charge sharing time. Therefore, the power saved may depend on the panel load (e.g., resistive-capacitive (RC) load) and various adjustment settings (e.g., set each pixel group to have a different charge sharing time).

Figure 3A:
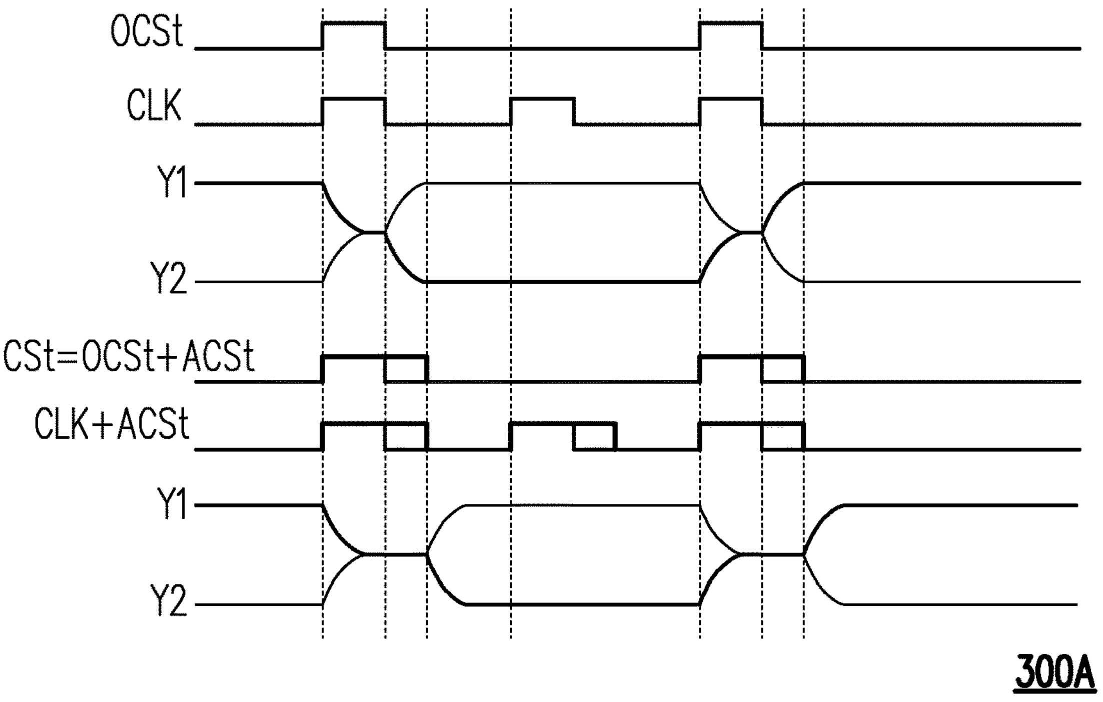
FIGS. 3A and 3B illustrate waveform diagrams of proximal and remote charge sharing and charge sharing time, respectively, according to an embodiment.
Figure 3B:
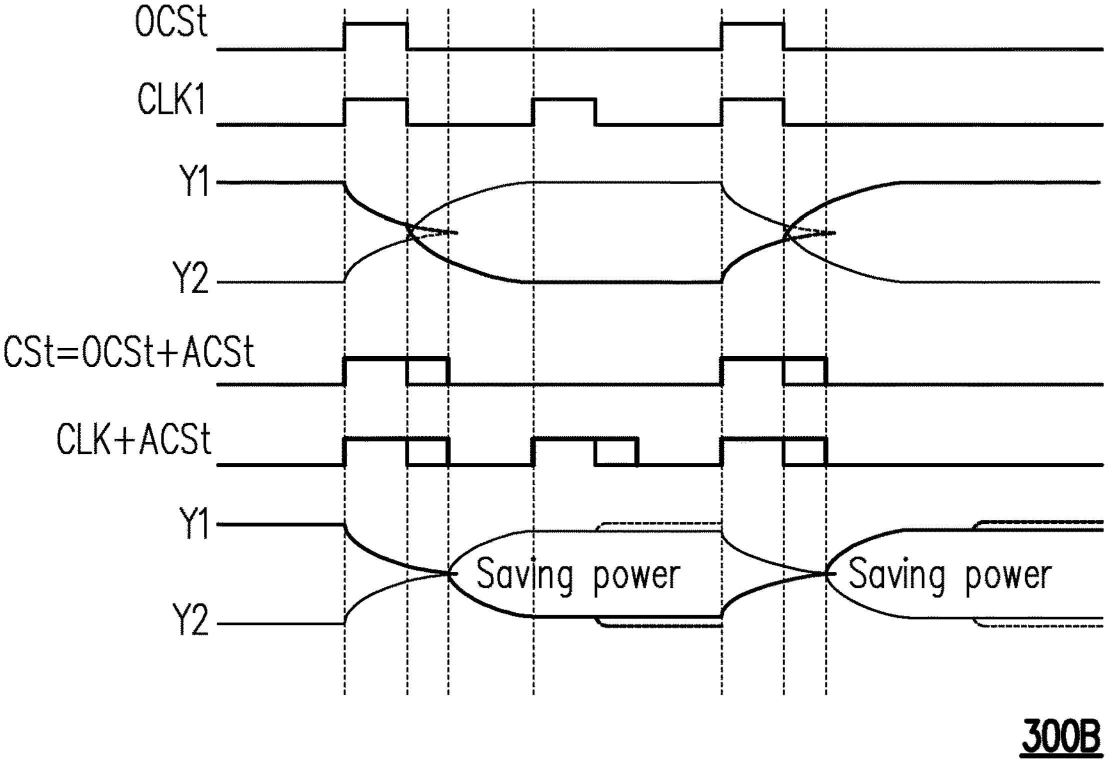

FIGS. 3A and 3B illustrate waveform diagrams of proximal and remote charge sharing and charge sharing time according to an embodiment of the present disclosure. Referring to FIGS. 3A and 3B, the waveform diagram 300A of FIG. 3A shows the charge sharing of the proximal pixel group, and the waveform diagram 300B of FIG. 3B shows the charge sharing of the remote pixel group. Continuing to refer to FIGS. 3A and 3B, the signal CLK represents the clock waveform, and the signals Y1 and Y2 both represent the output waveform. Since it does not require a long charging time to charge the proximal pixel group, based on this concept, the charge sharing time of the proximal pixel group may be increased to achieve better charge sharing and reduce power consumption.

Figure 4:
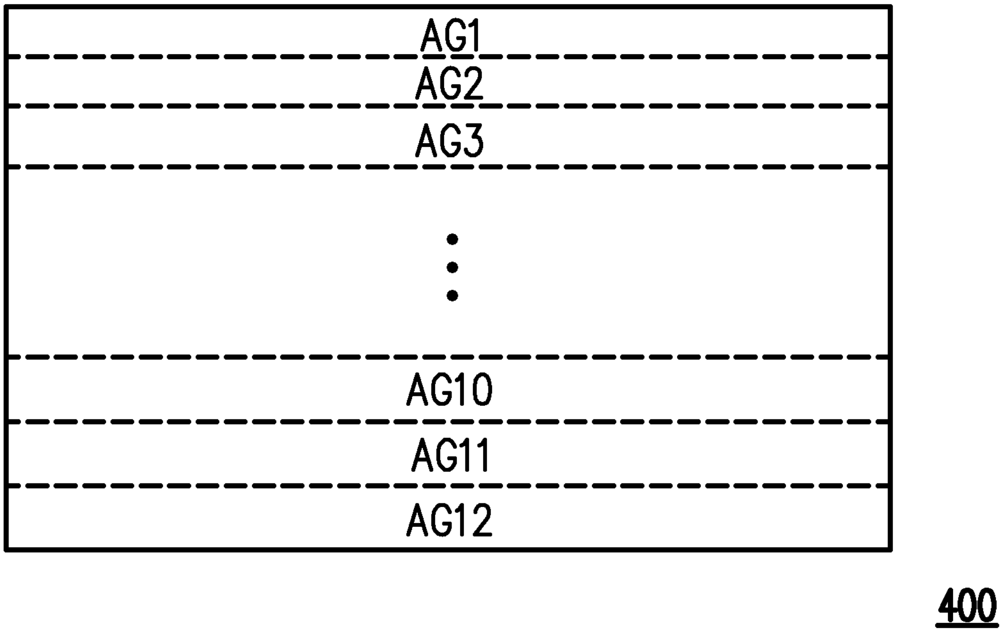
FIG. 4 is an exemplary diagram illustrating actual grouping of a plurality of pixels in a 4K display panel, according to an embodiment.

FIG. 4 is an exemplary diagram illustrating actual grouping of a plurality of pixels in a 4K display panel according to an embodiment of the present disclosure. For example, images comprising 4096×2160 pixels and/or 3840×2160 pixels may generally be referred to as "4K" images, and, as such, 4K display panels may adopt 4096×2160 pixels and/or 3840×2160 pixels as resolution standards. In an embodiment, the controller may set the pixel array 400 in a manner that each actual pixel group includes 180 gate lines (Glines), so the plurality of pixels may be divided into actual pixel groups AG1, AG2, AG3, AG4, AG5, AG6, AG7, AG8, AG9, AG10, AG11, and AG12.

In terms of flexible setting of charge sharing time, programmable setting conditions such as the three conditions shown in Table 2 may be obtained. Referring to Table 2, in Condition 1, the total number of groups G may be set to 18, such that the charge sharing time CSt of the actual pixel group AG1 may be set OCSt+17×Tcsd, the charge sharing time CSt of the actual pixel group AG2 may be set to OCSt+16×Tcsd, and so forth. It may be understood that Condition 1 is the most power-saving condition and may be suitable for light panel loads. Alternatively or additionally, Condition 3 may set the total number of groups G to 6, such that the charge sharing time CSt of the actual pixel group AG1 may be set to OCSt+5×Tcsd, the charge sharing time CSt of the actual pixel group AG2 may be set to OCSt+4×Tcsd and so forth, and the charge sharing times CSt of the actual pixel groups AG6 to AG12 may be set to OCSt+0×Tcsd. It may be understood that Condition 3 is a less power-saving condition and may be suitable for heavy panel loads.

TABLE 2

| Condition 1 | | Condition 2 | | Condition 3 | |
|---|---|---|---|---|---|
| OCSt | 1.6 us | OCSt | 1.6 us | OCSt | 1.6 us |
| Gline | 180 | Gline | 180 | Gline | 180 |
| G | 18 | G | 12 | G | 6 |
| Tcsd | 16 T | Tcsd | 16 T | Tcsd | 16 T |

Based on the above, by flexibly setting the charge sharing time, fine-tuning may be performed for different panel loads through configuration settings to optimize the charge sharing time. Consequently, embodiments of the present disclosure may enable realization of panel quality, as well as achieve power savings for different applications.

Figure 5:
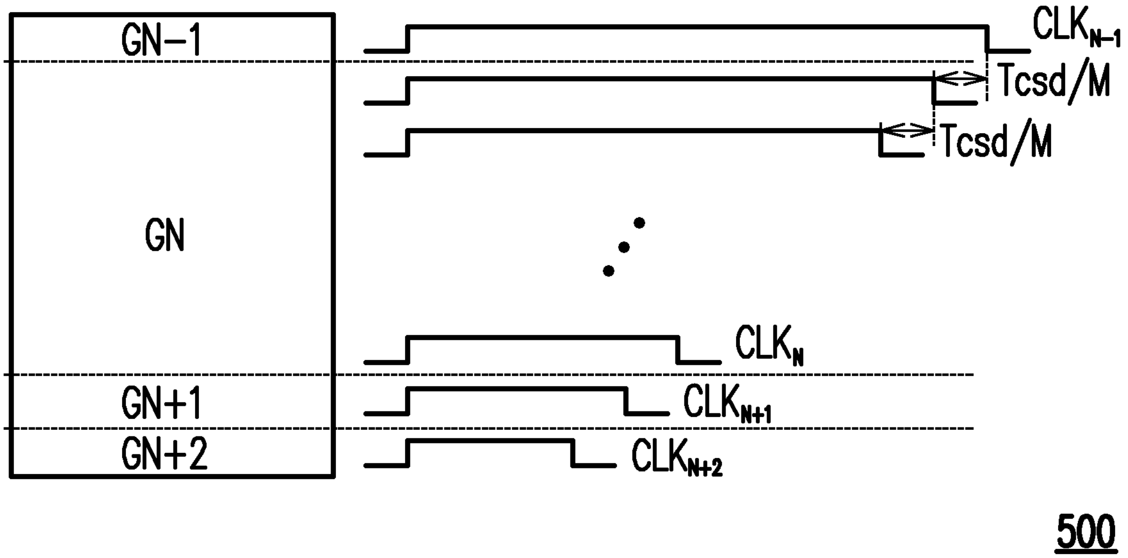
FIG. 5 is a waveform diagram of charge sharing time for enhancing panel quality, according to an embodiment.

FIG. 5 is a waveform diagram of charge sharing time for enhancing panel quality according to an embodiment of the present disclosure. As shown in FIG. 5, if a large charge sharing time difference Tcsd is applied, a band/mura phenomenon may occur in the panel display. Therefore, a decrement method in the waveform diagram 500 as shown in FIG. 5 may be additionally provided to ensure the panel quality. That is, as shown in FIG. 5, a charge sharing time difference may exist between the N−1th group of pixels (e.g., pixel group GN−1) and the N-th group of pixels (e.g., pixel group GN) and the difference may be large (e.g., significant) (referring to signals $CLK_{N-1}$ and $CLK_N$ of FIG. 5). Consequently, an embodiment may further uses a frequency divider (e.g., /M) between the N−1th group of pixels and the N-th group of pixels to divide the charge sharing time difference Tcsd to gradually increase the charge sharing time, thereby potentially avoiding the band/mura phenomenon. If the above-described situation occurs to the charge sharing time of the N+1th group of pixels (pixel group GN+1) and the N+2th group of pixels (pixel group GN+2) (refer to signals $CLK_{N+1}$ and $CLK_{N+2}$ of FIG. 5), analogy may be drawn from the above method and details are not repeated herein.

It should be noted that, the specific order and/or hierarchy of steps in the method of the embodiments of the present disclosure are merely exemplary paths. Based on design preferences, the specific order or hierarchy of steps of the disclosed method or process may be rearranged while remaining within the scope of the present embodiments. Accordingly, those of ordinary skill in the art should understand that the methods and techniques of the present embodiments present various steps or actions in an exemplary order, and that the present embodiments are not limited to the specific order or hierarchy presented unless explicitly stated otherwise.

According to different design requirements, the blocks of the above-mentioned source driver 102 and/or the controller may be implemented in the form of hardware, firmware, software (program) or a combination of multiple of the three.

In terms of hardware, the blocks of the above-mentioned source driver 102 and/or the controller may be implemented as logic circuits on an integrated circuit. Related functions of the above-mentioned source driver 102 and/or the controller may be implemented in hardware using hardware description languages (such as Verilog hardware description language (HDL or VHDL), for example) or other suitable programming languages. For example, related functions of the above-mentioned source driver 102 and/or the controller may be implemented in one or more controllers, microcontrollers, microprocessors, ASICs, DSPs, field programmable gate arrays (FPGAs), and/or various logic blocks, modules and circuits in other processing units.

In terms of software and/or firmware, related functions of the above-mentioned source driver 102 and/or the controller may be implemented as programming codes/computer program instructions. For example, the above-mentioned source driver 102 and/or the controller may be implemented using general programming languages (e.g., C, C++ or assembly language) or other suitable programming languages. The programming code/computer program instructions may be recorded/stored in a recording medium. The recording medium, for example, includes a read only memory (ROM), a storage device and/or a random access memory (RAM). A computer, a CPU, a controller, a microcontroller or a microprocessor can read and execute the programming code/computer program instructions from the recording medium to achieve related functions. As the recording medium, a non-transitory computer-readable medium may be adopted, and for example, a tape, a disk, a card, a semiconductor memory, and a programmable logic circuit may be adopted. Furthermore, the program may be provided to the computer (or CPU) via any transmission medium (communication network, broadcast waves, or the like). The communication network is, for example, the Internet, wired communication, wireless communication, or other communication media.

The setting method of charge sharing time, the apparatus, and the non-transitory computer-readable medium provided by the embodiments of the present disclosure may group a plurality of pixels, and then set the charge sharing time of each pixel according to the total number of pixel groups. There is a decrement from the charge sharing time of the pixel closest to the source driver in the pixel array to the charge sharing time of the pixel farthest from the source driver in the pixel array. In this way, the setting method of charge sharing time of the present disclosure may further reduce power consumption when compared with related setting methods of charge sharing time. In addition, the setting method of charge sharing time of the present disclosure may also adapt to different panel loads and help the system to save power (power saving) through the flexible and programmable setting of charge sharing time.

Although the present disclosure has been disclosed above with embodiments, it is not intended to limit the present disclosure. Anyone with ordinary knowledge in the technical field can make some changes and modifications without departing from the spirit and scope of the present disclosure. Therefore, the scope to be protected by the present disclosure shall be determined by the scope of the appended claims.

What is claimed is:

1. A setting method of charge sharing times of a display panel, comprising:

grouping a plurality of pixels of the display panel in a row direction to form a plurality of pixel groups, the plurality of pixels being comprised by a pixel array of the display panel, each pixel of the pixel array being grouped in a corresponding pixel group of the plurality of pixel groups, the plurality of pixel groups comprising N pixel groups; and setting a charge sharing time to each pixel group of the plurality of pixel groups according to a quantity of pixel groups in the plurality of pixel groups, wherein the setting of the charge sharing time comprises setting a sequentially decreasing charge sharing time to each pixel group of the plurality of pixel groups, based on a first location of a corresponding pixel group of the plurality of pixel groups with respect to a second location of a source driver, wherein a first charge sharing time of a first pixel group located closest to the source driver in the pixel array is greater than a second charge sharing time of an N-th pixel group located farthest from the source driver in the pixel array, wherein the first pixel group corresponds to a first row of the pixel array and the N-th pixel group corresponds to a last row of the pixel array, and wherein at least one pixel group of the plurality of pixel groups is between the first row of the pixel array and the last row of the pixel array.

2. The setting method according to claim 1, wherein the first charge sharing time of the first pixel group located closest to the source driver is greater than each of first remaining sequentially decreasing charge sharing times of first remaining pixel groups of the plurality of pixel groups, and wherein the second charge sharing time of the N-th pixel group located farthest from the source driver is less than each of second remaining sequentially decreasing charge sharing times of second remaining pixel groups of the plurality of pixel groups.

3. The setting method according to claim 1, further comprising:

obtaining a predetermined charge sharing time of the plurality of pixels;

calculating an additional charge sharing time of each pixel group of the plurality of pixel groups according to the quantity of pixel groups and charge sharing time differences between each pixel group of the plurality of pixel groups; and adding the predetermined charge sharing time and the additional charge sharing time of each pixel group of the plurality of pixel groups to obtain the charge sharing time of each pixel group of the plurality of pixel groups.

4. The setting method according to claim 3, wherein the second charge sharing time of the N-th pixel group located farthest from the source driver in the pixel array is equal to the predetermined charge sharing time.

5. The setting method according to claim 4, wherein charge sharing times of first remaining pixel groups of the plurality of pixel groups are sequentially decremented by the charge sharing time differences and charge sharing times of second remaining pixel groups of the plurality of pixel groups match the predetermined charge sharing time.

6. The setting method according to claim 3, further comprising:

dividing, using a frequency divider, the charge sharing time differences between each pixel group of the plurality of pixel groups to increase the charge sharing time of each pixel group of the plurality of pixel groups.

7. The setting method according to claim 1, wherein the setting of the charge sharing time further comprises:

setting the charge sharing time of each pixel group of the plurality of pixel groups according to a resistive-capacitive (RC) load of pixels in each pixel group of the plurality of pixel groups.

8. A non-transitory computer-readable medium storing computer program instructions, the computer program instructions being configured, when executed by a processor of a display panel, to cause the display panel to:

group a plurality of pixels of the display panel in a row direction to form a plurality of pixel groups, the plurality of pixels being comprised by a pixel array of the display panel, each pixel of the pixel array being grouped in a corresponding pixel group of the plurality of pixel groups, the plurality of pixel groups comprising N pixel groups; and set a charge sharing time to each pixel group of the plurality of pixel groups according to a quantity of pixel groups in the plurality of pixel groups, wherein to set the charge sharing time comprises to set a sequentially decreasing charge sharing time to each pixel group of the plurality of pixel groups, based on a first location of a corresponding pixel group of the plurality of pixel groups with respect to a second location of a source driver, wherein a first charge sharing time of a first pixel group located closest to the source driver in the pixel array is greater than a second charge sharing ti me of an N-th pixel group located farthest from the source driver in the pixel array, wherein the first pixel group corresponds to a first row of the pixel array and the N-th pixel group corresponds to a last row of the pixel array, and wherein at least one pixel group of the plurality of pixel groups is between the first row of the pixel array and the last row of the pixel array.

9. The non-transitory computer-readable medium according to claim 8, wherein the first charge sharing time of the first pixel group located closest to the source driver is greater than each of first remaining sequentially decreasing charge sharing times of first remaining pixel groups of the plurality of pixel groups, and wherein the second charge sharing time of the N-th pixel group located farthest from the source driver is less than each of second remaining sequentially decreasing charge sharing times of second remaining pixel groups of the plurality of pixel groups.

10. The non-transitory computer-readable medium according to claim 8, wherein the computer program instructions are further configured to further cause the display panel to:

obtain a predetermined charge sharing time of the plurality of pixels;

calculate an additional charge sharing time of each pixel group of the plurality of pixel groups according to the quantity of pixel groups and charge sharing time differences between each pixel group of the plurality of pixel groups; and add up the predetermined charge sharing time and the additional charge sharing time of each pixel group of the plurality of pixel groups to obtain the charge sharing time of each pixel group of the plurality of pixel groups.

11. The non-transitory computer-readable medium according to claim 10, wherein the second charge sharing time of the N-th pixel group located farthest from the source driver in the pixel array is equal to the predetermined charge sharing time.

12. The non-transitory computer-readable medium according to claim 11, wherein charge sharing times of first remaining pixel groups of the plurality of pixel groups are sequentially decremented by the charge sharing time differences and charge sharing times of second remaining pixel groups of the plurality of pixel groups match the predetermined charge sharing time.

13. The non-transitory computer-readable medium according to claim 10, wherein the computer program instructions are further configured to further cause the display panel to:

divide, using a frequency divider, the charge sharing time differences between each pixel group of the plurality of pixel groups to increase the charge sharing time of each pixel group of the plurality of pixel groups.

14. The non-transitory computer-readable medium according to claim 8, wherein the computer program instructions are further configured to further cause the display panel to:

set the charge sharing time of each pixel group of the plurality of pixel groups according to a resistive-capacitive (RC) load of pixels in each pixel group of the plurality of pixel groups.

15. An apparatus, comprising:

a pixel array comprising a plurality of pixels disposed in a plurality of columns;

a source driver configured to drive each column of the plurality of columns of the pixel array;

a memory storing one or more instructions; and a processor communicatively coupled to the pixel array, the source driver, and the memory, and configured to execute the one or more instructions stored in the memory to:

group the plurality of pixels of the pixel array in a row direction to form a plurality of pixel groups, each pixel of the pixel array being grouped in a corresponding pixel group of the plurality of pixel groups, the plurality of pixel groups comprising N pixel groups; and set a charge sharing time to each pixel group of the plurality of pixel groups according to a quantity of pixel groups in the plurality of pixel groups, wherein to set the charge sharing time comprises to set a sequentially decreasing charge sharing time to each pixel group of the plurality of pixel groups, based on a first location of a corresponding pixel group of the plurality of pixel groups with respect to a second location of the source driver, wherein a first charge sharing time of a first pixel group located closest to the source driver is greater than a second charge sharing time of an N-th pixel group located farthest from the source driver, wherein the first pixel group corresponds to a first row of the pixel array and the N-th pixel group corresponds to a last row of the pixel array, and wherein at least one pixel group of the plurality of pixel groups is between the first row of the pixel array and the last row of the pixel array.

16. The apparatus according to claim 15, wherein the first charge sharing time of the first pixel group located closest to the source driver is greater than each of first remaining sequentially decreasing charge sharing times of first remaining pixel groups of the plurality of pixel groups, and wherein the second charge sharing time of the N-th pixel group located farthest from the source driver is less than each of second remaining sequentially decreasing charge sharing times of second remaining pixel groups of the plurality of pixel groups.

17. The apparatus according to claim 15, wherein the processor is further configured to execute the one or more instructions to:

obtain a predetermined charge sharing time of the plurality of pixels;

calculate an additional charge sharing time of each pixel group of the plurality of pixel groups according to the quantity of pixel groups and charge sharing time differences between each pixel group of the plurality of pixel groups; and add up the predetermined charge sharing time and the additional charge sharing time of each pixel group of the plurality of pixel groups to obtain the charge sharing time of each pixel group of the plurality of pixel groups.

18. The apparatus according to claim 17, wherein the second charge sharing time of the N-th pixel group located farthest from the source driver is equal to the predetermined charge sharing time.

19. The apparatus according to claim 17, wherein the processor is further configured to execute the one or more instructions to:

divide, using a frequency divider, the charge sharing time differences between each pixel group of the plurality of pixel groups to increase the charge sharing time of each pixel group of the plurality of pixel groups.

20. The apparatus according to claim 15, wherein the processor is further configured to execute the one or more instructions to:

set the charge sharing time of each pixel group of the plurality of pixel groups according to a resistive-capacitive (RC) load of pixels in each pixel group of the plurality of pixel groups.

* * * * *